United States Patent [19]
Cannon et al.

[11] Patent Number: 5,881,069
[45] Date of Patent: Mar. 9, 1999

[54] METHOD AND APPARATUS FOR ERROR CORRECTION PROCESSING IN A RADIO COMMUNICATION DEVICE

[75] Inventors: Gregory Lewis Cannon; Philip Mac Walker, both of Keller, Tex.

[73] Assignee: Motorola, Inc., Schaumburg, Ill.

[21] Appl. No.: 989,695

[22] Filed: Dec. 12, 1997

[51] Int. Cl.[6] .................................................. H04L 1/08
[52] U.S. Cl. .................. 371/32; 371/30; 371/31; 371/33; 371/34; 371/35; 371/37.4; 371/37.7; 371/36; 340/825.44; 375/200
[58] Field of Search ................... 340/825.44; 371/30, 371/31, 32, 33, 34, 35, 37.4, 37.7, 36; 375/200

[56] References Cited

U.S. PATENT DOCUMENTS 5,426,653  6/1995  Hayes et al. ............................. 371/36
5,497,382  3/1996  Levine et al. ........................... 371/35
5,761,217  6/1998  Soumiya et al. ......................... 371/30

*Primary Examiner*—Brian Zimmerman
*Assistant Examiner*—Yves Dalencourt
*Attorney, Agent, or Firm*—Pablo Meles; Charles W. Bethards

[57] ABSTRACT

A method (400) for error correction processing of a repeat message in a messaging system where each repeat message contains errors in different portions of the repeat message includes the steps in a portable subscriber unit (122) of receiving a first copy containing a first set of errors (402) and receiving a subsequent copy containing a subsequent set of errors (406). A comparison (410) between the first set and subsequent set of errors is done to eliminate (412) any non-recurring errors in forming an error reduced message. The error reduced message is corrected as necessary if an nth copy of the repeat message is received and if errors remain in the error reduced message by comparing a set of remaining errors in the error reduced message with an nth set of errors found in the nth copy of the repeat message to eliminate any further non-recurring errors.

13 Claims, 4 Drawing Sheets

METHOD AND APPARATUS FOR ERROR CORRECTION PROCESSING IN A RADIO COMMUNICATION DEVICE

FIELD OF THE INVENTION

This invention relates in general to radio communication systems and more specifically to a method and apparatus of error correcting information contained in repeat messages received at a portable subscriber unit.

BACKGROUND OF THE INVENTION

In both one-way paging and two-way messaging, duplicate messages may be sent to a selective call device such as a selective call receiver or transceiver for a variety of reasons. A one-way paging system may intentionally be designed to send duplicate messages to create (at the expense of system latency and capacity) greater reliability through time diversity, such as in Motorola's FLEX-TD paging system used in Japan. In each instance, there are several factors that creates complications in the processing of such duplicate messages. For instance, when messages are sent multiple times in an unreliable radio frequency environment, errored characters are received. Most errors are corrected using forward error correction, but some errors are only detected. Other codewords in the message may be so badly corrupted that they correct to the wrong codeword. When a badly corrupted portion of a message corrects to a wrong codeword or character, falsing occurs and detection of duplicate messages becomes a significant problem. In current alphanumeric two-way paging, for example, detected errors are handled in duplicate message processing by negative acknowledging (NACK'ing) errored messages. The negative acknowledgment (NACK) of an errored message creates further channel traffic and thus reduces overall system capacity.

In a two-way messaging environment, a message may be resent to a selective call transceiver (pager) because the message was not delivered well (possibly had too many errors), or an acknowledgment was not received by the two-way messaging system. If a receiver of a message is in a marginal coverage area in a two-way paging environment, messages will likely contain errors. These errors will likely cause a checksum to fail and the message will be negative acknowledged or "NACKed". Repeats of the message are not likely to be any better, particularly for long messages.

Thus, a need exists for a duplicate message processing method and apparatus that recognizes the problem encountered by errored messages and that appropriately handles such duplicate messages by avoiding the unnecessary repeat NACK, display or alerting of such duplicate messages.

SUMMARY OF THE INVENTION

In a first aspect of the present invention, a method for error correction processing of a repeat message transmitted to a portable subscriber unit in a messaging system wherein each repeat message may contain errors in different portions of the repeat message comprises the steps at the portable subscriber unit of receiving a first copy of the repeat message containing a first set of errors and receiving a subsequent copy of the repeat message containing a subsequent set of errors. Then the method compares the first set of errors with the subsequent set of errors to eliminate any non-recurring errors in the formation of an error reduced message and correcting the error reduced message as necessary if an nth copy of the repeat message is received and if errors remain in the error reduced message by comparing a set of remaining errors in the error reduced message with an nth set of errors found in the nth copy of the repeat message to eliminate any further non-recurring errors.

In a second aspect of the present invention, a selective call subscriber unit in a messaging system capable of error correcting messages that are sent repeatedly to the selective call subscriber unit comprises a receiver coupled to a decoder and a processor coupled to the receiver and decoder. The processor is preferably programmed to receive a first copy of the repeat message containing a first set of errors and receive a subsequent copy of the repeat message containing a subsequent set of errors. The processor is further programmed to compare the first set of errors with the subsequent set of errors to eliminate any non-recurring errors in the formation of an error reduced message and further programmed to correct the error reduced message as necessary if an nth copy of the repeat message is received and if errors remain in the error reduced message by comparing a set of remaining errors in the error reduced message with an nth set of errors found in the nth copy of the repeat message to eliminate any further non-recurring errors.

DETAILED DESCRIPTION

Figure 1:
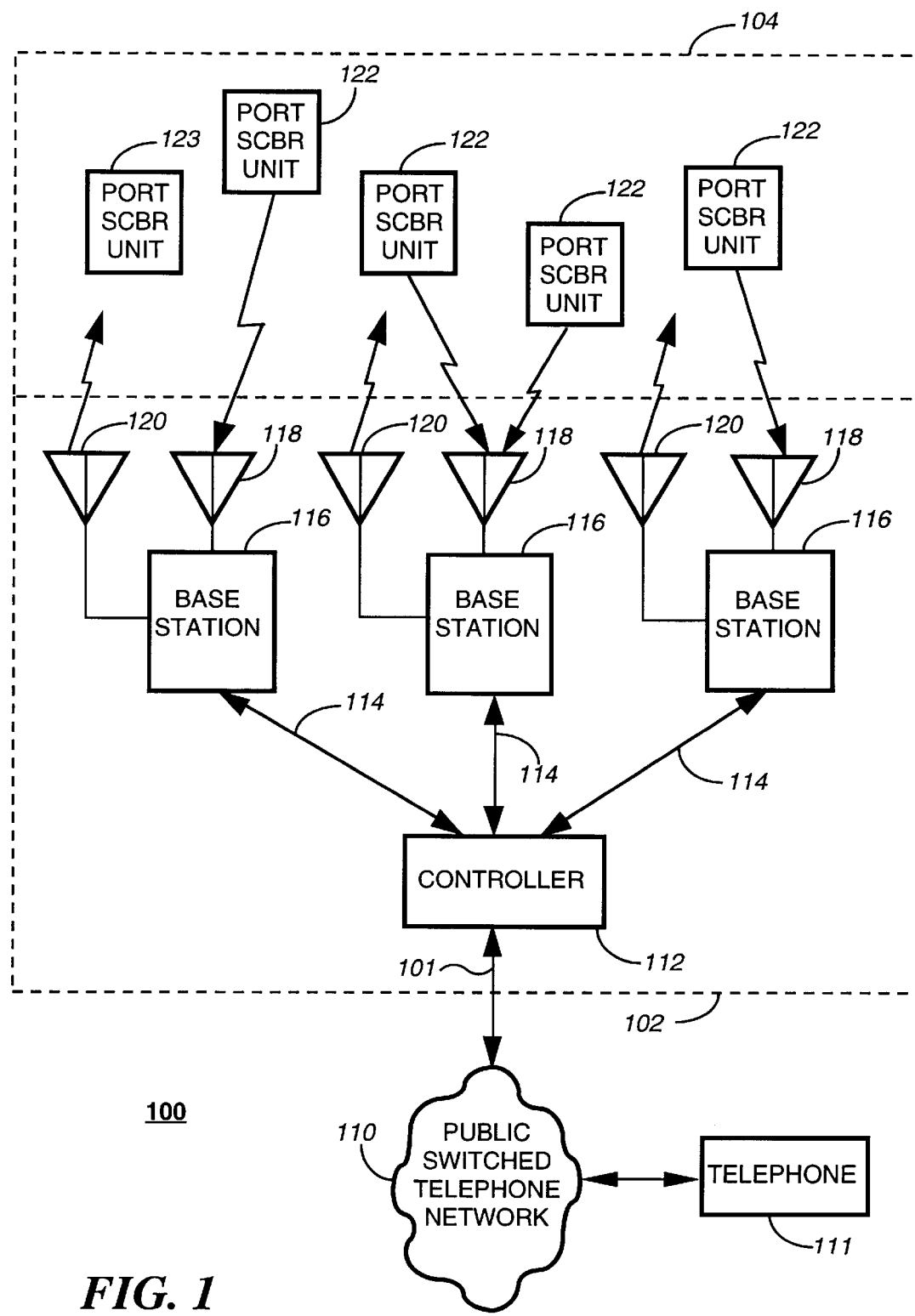
FIG. 1 is block diagram of a communication system in accordance with the present invention.

Referring to FIG. 1, a block diagram of a communication system 100 in accordance with the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably similar to the Wireless Messaging Gateway (WMG™) Administrator! messaging terminal manufactured by Motorola, Inc. of Schaumburg, Ill. The hardware of the base stations 116 is preferably similar to the Nucleus® II transmitter manufactured by Motorola, Inc. of Schaumburg, Ill. Other similar hardware can be utilized as well for the controller 112 and base stations 116. The controller 112 comprises a plurality of firmware elements in accordance with the present invention, as will be described further below.

Each of the base stations 116 transmits radio signals to the portable portion 104 comprising a plurality of portable subscriber units 122 and 123 via a transmitting antenna 120. Note that it is within contemplation of the present invention to use either a selective call transceiver 122 or a selective call receiver 123. The base stations 116 each receive radio signals from the plurality of portable subscriber units 122 via a receiving antenna 118 coupled to a base receiver within the base station (see FIG. 2). The radio signals comprise selective call addresses and messages transmitted to the portable subscriber units 122 and 123 and acknowledgments received from the portable subscriber units 122. It will be appreciated that the portable subscriber units 122 can also originate messages other than acknowledgments. The controller 112 preferably is coupled to a conventional telephone 111 via telephone links 101 and a public switched telephone network (PSTN) 110 for receiving selective call originations therefrom. Selective call originations comprising voice and data messages from the PSTN 110 can be generated, for example, from the conventional telephone 111 coupled to the PSTN 110 in a manner that is well known in the art.

Data and control transmissions between the base stations 116 and the portable subscriber units 122 and 123 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 122 to the base stations 116 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and inbound channels.

U.S. Pat. No. 4,875,038 to Siwiak et al., which describes a prior acknowledge-back selective call communication system, is hereby incorporated herein by reference. For further information on the operation and structure of an acknowledge-back selective call communication system, please refer to the Siwiak et al. patent.

Figure 2:
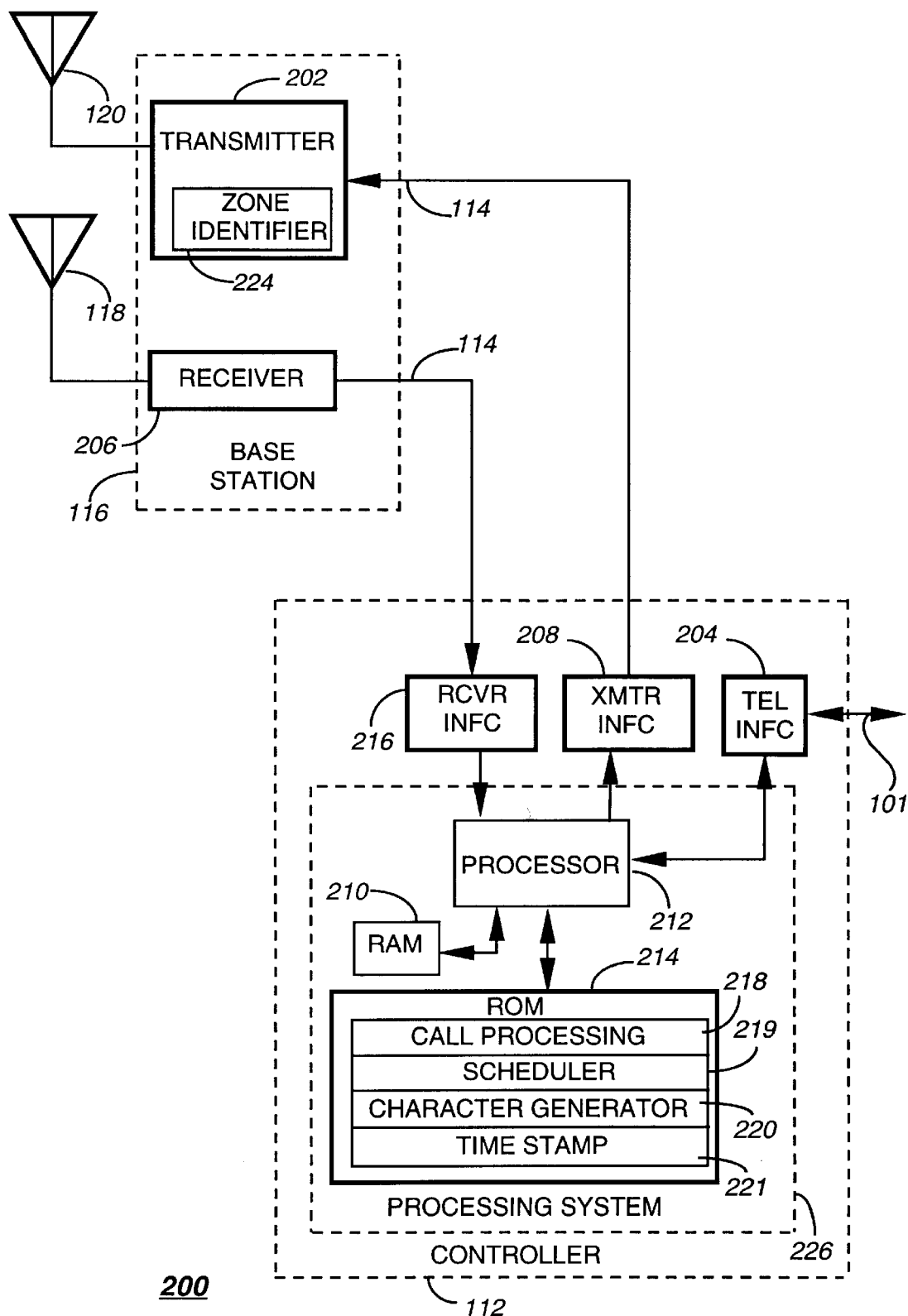
FIG. 2 is an electrical block diagram of portions of a controller and base station in accordance with the present invention.

Referring to FIG. 2, an electrical block diagram 200 of portions of the controller 112 and base station 116 in accordance with the present invention shows that the controller 112 comprises a processing system 226 for directing operation of the controller 112. The processing system 226 includes a processor 212 that is preferably coupled through a transmitter interface 208 to a transmitter 202, both utilizing conventional techniques well known in the art. The transmitter 202 preferably transmits two- and four-level FSK data messages to the portable subscriber units 122 (or 123). Also preferably, the transmitter 202 comprises a zone identifier 224 stored within a non-volatile memory thereof for identifying a coverage zone in which the transmitter operates. The zone identifier 224 is preferably a non-zero value unique to the zone in which the transmitter 202 is located.

The processor 212 is also coupled through a conventional receiver interface 216 to at least one acknowledgment receiver 206 using conventional binary FSK demodulation. The acknowledgment receiver 206 can be collocated with the base stations 116, as implied in FIG. 2, but preferably is positioned remote from the base stations 116 to avoid interference from the transmitter 202. Additionally, a number of remote acknowledgment receivers 206 could be used and coupled to the receiver interface 216. The acknowledgment receiver 206 is for receiving one or more acknowledgments from the plurality of portable subscriber units 122. In addition, the processor 212 is coupled through a telephone interface 204 to the telephone links 101 and thence to the PSTN 110 (shown in FIG. 1) for receiving message originations therefrom.

The processor 212 is coupled to a random access memory (RAM) 210 for storing messages to be transmitted to the portable subscriber units 122 or 123, and for storing messages received from the portable subscriber units 122. The processor 212 also is coupled to a read-only memory (ROM) 214 comprising firmware elements for use by the processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the processor 212. Preferably, the processing system 226 is a conventional, commercially available computer system such as a VME Sparc processor system manufactured by Sun Microsystems, Inc. It will be appreciated that other similar processors can be utilized as well for the processor system 226, and that additional processor systems of the same or alternative type can be added as required to handle the processing requirements of the controller 112. The firmware elements of the controller 112 preferably comprise a call processing element 218 for processing calls in a manner well known in the art. Further, the ROM 214 preferably contains additional firmware elements including a scheduler element 219, a character generator element 220, and a time stamping element 221. The call processing element 218 receives a plurality of messages for the subsequent wireless transmission to a plurality of portable subscribers units. The scheduler element 219 assigns a message sequence number (MSN) to each of the plurality of messages and the character generator element 220 appends a special character (like a control character) to each of the messages, wherein the special character would allow a duplication processor at each of the portable subscriber units to ignore characters appended after the special character (at least for duplicate message determinations). For instance, the time stamping element could provide both a time stamp and time zone indication after the special character which should be ignored for purposes of character by character comparison in the duplicate message recognition process. Of course, the time stamp would not necessarily be ignored, but can be used to determine if the message is stale compared to a previously received message.

Figure 3:
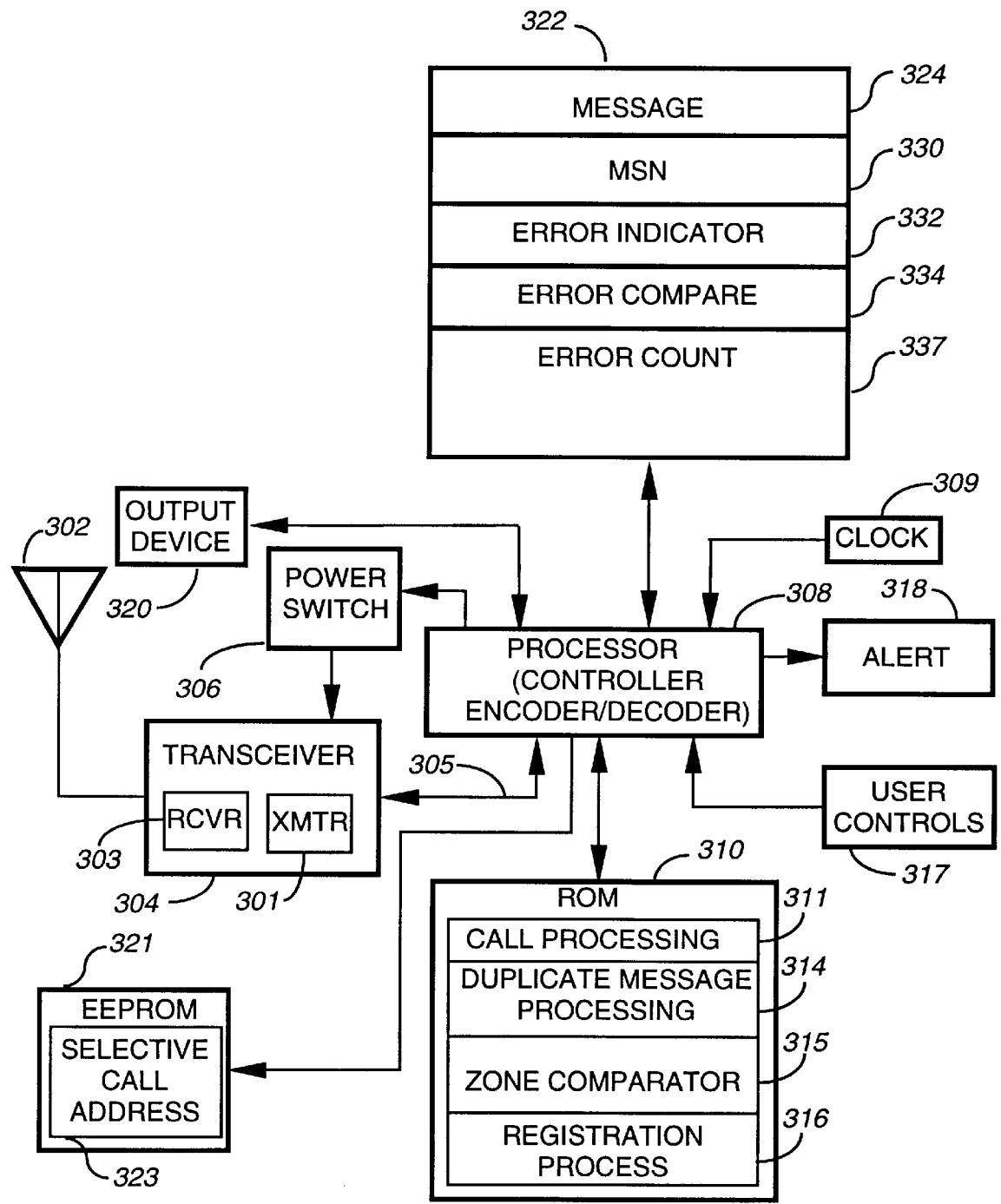
FIG. 3 is an electrical block diagram of a portable subscriber unit in accordance with the present invention.

Referring to FIG. 3, an electrical block diagram depicts the portable subscriber unit 122 in accordance with the present invention. The portable subscriber unit 122 comprises a transceiver antenna 302 for transmitting and intercepting radio signals to and from the base stations 116. The radio signals linked to the transceiver antenna 302 are coupled to a transceiver 304 comprising a conventional transmitter 301 and receiver 303. The radio signals received from the base stations 116 preferably use conventional two and four-level FSK. It will be appreciated by one of ordinary skill in the art that the transceiver antenna 302 is not limited to a single antenna for transmitting and receiving radio signals. Separate antennas for receiving and transmitting radio signals would also be suitable.

Radio signals received by the transceiver 304 produce demodulated information at the output. The demodulated information is transferred over a signal information bus 305 which is coupled to the input of a processor 308, which processes the information in a manner well known in the art. Similarly, acknowledge response messages are processed by the processor 308 and delivered through the signal information bus 305 to the transceiver 304. The acknowledge response messages transmitted by the transceiver 304 are preferably modulated using four-level FSK operating at a bit rate of ninety-six-hundred bps. It will be appreciated that, alternatively, other bit rates and other types of modulation can be used as well.

A conventional power switch 306, coupled to the processor 308, is used to control the supply of power to the transceiver 304, thereby providing a battery saving function. A clock 309 is coupled to the processor 308 to provide a timing signal used to time various events as required in accordance with the present invention. The processor 308 also is preferably coupled to a electrically erasable programmable read only memory (EEPROM) 321 which comprises at least one selective call address 323 assigned to the portable subscriber unit 122 and used to implement the selective call feature. The processor 308 also is coupled to a random access memory (RAM) 322 for storing the at least some of the following: a message in a plurality of message storage locations 324, a message sequence number (MSN) 330 corresponding to each of the messages stored in memory, an error indicator 332, and an error compare 334. In addition, an error counter 337 should be maintained to keep track of the number of errors found in each of the corresponding messages. Of course, other information could be stored that would be useful in a two-way messaging system such as zone identifiers and general purpose counters to preferably count calls (to and from the PSU). The table below showing a sampling of the contents of the RAM 322 may further illustrate the method and apparatus in accordance with the present invention.

| MESSAGE | ERRORED PORTIONS | | | | | | | | | | AC-TION |
|---|---|---|---|---|---|---|---|---|---|---|---|
| | 1 | 2 | 3 | 4 | 5 | 6 | 7 | 8 | 9 | 10 | |
| MESSAGE A | 0 | 0 | 0 | 1 | 0 | 1 | 1 | 0 | 0 | 0 | NACK |
| MESSAGE B | 0 | 0 | 1 | 0 | 0 | 1 | 0 | 0 | 1 | 0 | IDLE |
| MESSAGE X | 0 | 0 | 0 | 0 | 0 | 1 | 0 | 0 | 0 | 0 | *NACK |
| MESSAGE C | 0 | 1 | 0 | 0 | 0 | 0 | 0 | 1 | 0 | 1 | IDLE |
| ALT. MSG C | | | | | | 0 | | | | | |
| MESSAGE Y | 0 | 0 | 0 | 0 | 0 | 0 | 0 | 0 | 0 | 0 | ACK |

In the example above, message A is received, having uncorrectable errors in words 4, 6, and 7. Message A would typically be NACK'ed. Message B is received having uncorrectable errors in words 3, 6, and 9. This message could be NACK'ed as well, but not necessarily. The portable subscriber unit combines Words 4 and 7 from Message B with Words 3 and 9 from Message A to create a Message X, which could potentially still contain errors (in this case we still have an error in Word 6). At this point, the portable subscriber unit could optionally NACK and request retransmission of uncorrectable Words that remain (as shown by "ALT. MSG C") or wait for another duplicate transmission to perform further Word correction. If another duplicate message is sent, such as Message C containing errors in Words 2, 8, and 10, then a Message Y can be created combining Word 6 of Message C with Message X. If the Checksum matches at this point, then the portable subscriber unit can Acknowledge the message in response to receiving Message C instead of NACK'ing Message C. Of course, there could be other variants that would change the order of the combining. For instance, an algorithm in accordance with the present invention could utilize more information from messages with less errors given a choice. This would be useful since the probability of obtaining information for a message that had false characters would be less in a message that had less errors. Thus a need for an error count element as shown in FIG. 3.

In accordance with one aspect of the present invention, a selective call subscriber unit 122 in a messaging system capable of error correcting messages that are sent repeatedly to the selective call subscriber device comprises a receiver 303 coupled to a decoder and a processor 308 coupled to the receiver and decoder. The processor 308 is preferably programmed to receive a first copy of the repeat message containing a first set of errors and further programmed to identify the first set of errors. Likewise, the processor is programmed to receive a subsequent copy of the repeat message containing a subsequent set of errors and further programmed to identify the subsequent set of errors. The processor is then programmed to compare the first set of errors with the subsequent set of errors to eliminate any non-recurring errors in the formation of an error reduced message and further programmed to correct the error reduced message as necessary if an nth copy of the repeat message is received and if errors remain in the error reduced message by comparing a set of remaining errors in the error reduced message with an nth set of errors found in the nth copy of the repeat message to eliminate any further non-recurring errors.

The selective call subscriber 122 in the form of a two-way messaging unit may also comprise a transmitter 303 coupled to a encoder and further coupled to the processor 308. It should be understood that the processor 308 in the present invention could serve as both the decoder and encoder. In the case of a two-way messaging unit, the processor may further be programmed to command the transmitter to transmit a negative acknowledgment signal to the messaging system when an error is identified in a copy of the repeat message by the portable subscriber unit. Note, that this may not be necessary and preferably the processor is further programmed to command the transmitter to transmit a negative acknowledgment signal to the messaging system only when an error is still identified in the error reduced message. Alternatively, the processor can be programmed to command the transmitter to transmit a request for retransmission of portions of the repeat message that contained identified errors. Of course, the processor should be programmed to command the transmitter to transmit an acknowledgment signal to the messaging system when no errors are identified in the error reduced message or optionally when no errors are identified in the error reduced message and a checksum value matches a predetermined checksum.

Figure 4:
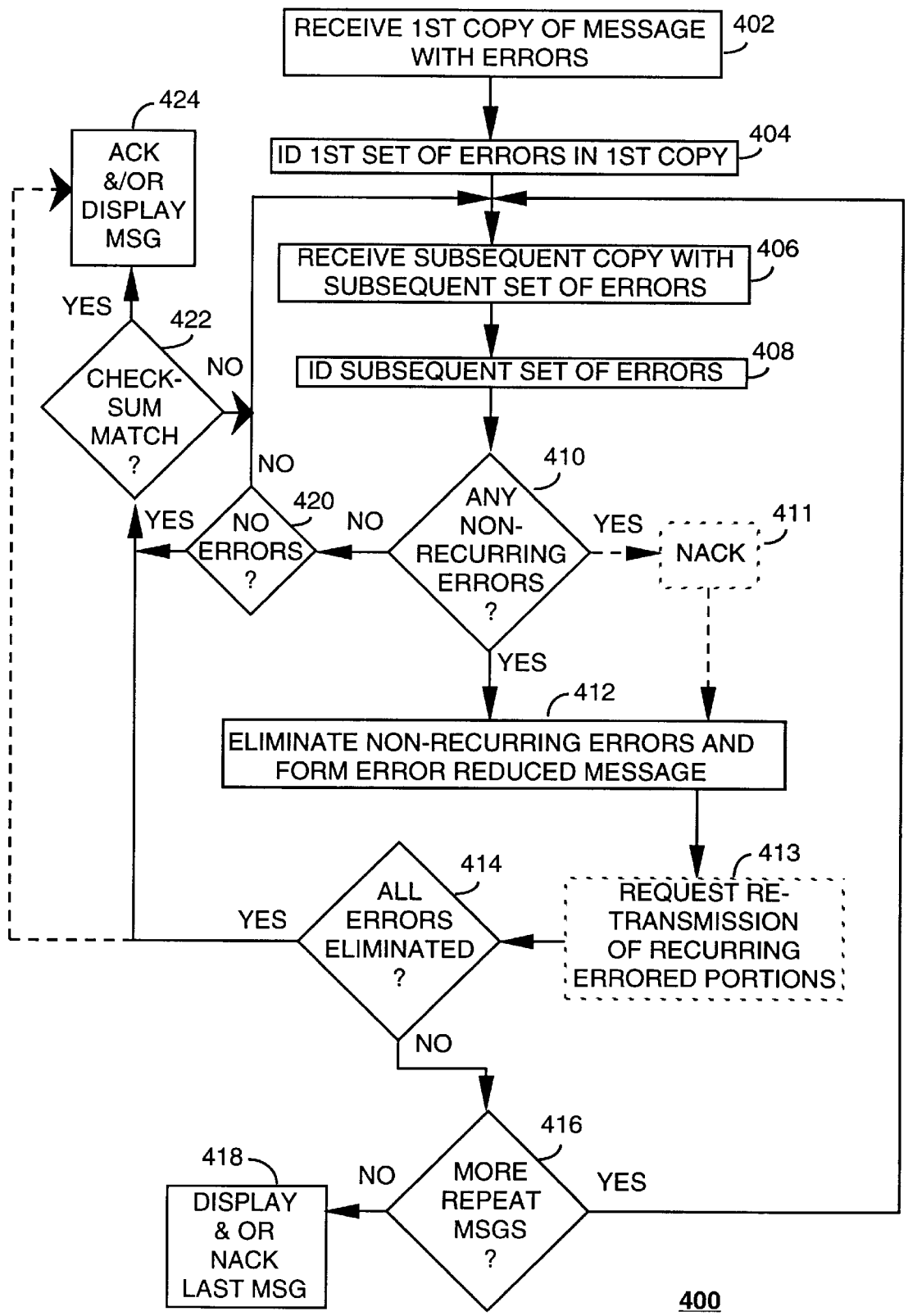
FIG. 4 is a flow chart depicting operation of the portable subscriber unit in accordance with the present invention.

With reference to FIG. 4, a method 400 for error correction processing of a repeat message transmitted to a portable subscriber unit in a messaging system wherein each repeat message may contain errors in different portions of the repeat message is shown. The method 400 comprises the steps at the portable subscriber unit of receiving a first copy of the repeat message containing a first set of errors at step 402 and identifying the first set of errors at step 404. Then, the method proceeds to receive a subsequent copy of the repeat message containing a subsequent set of errors at step 406. As before, the subsequent set of errors are identified at step 408. At step 410, a comparison is done comparing the first set of errors with the subsequent set of errors. If non-recurring errors are found, then the non-recurring errors are eliminated at step 412 in the process of forming an error reduced message. If no non-recurring errors are found, then a check is made for recurring error at step 420. If no errors are found at this point and the checksum matches at step 422, then the message can be acknowledged and/or displayed at the portable subscriber device at step 424. If recurring errors are still found at step 420, then the method continues to receive subsequent copies of the message with subsequent sets of errors at step 406. After step 412, wherein non-recurring errors are eliminated the method may optionally request the retransmission of the recurring errored portions at step 413. In other words, the method requests retransmission of portions of the repeat message that contained identified errors. If all errors are eliminated at step 414 and the checksum matches at step 422, then the message can be acknowledged and/or displayed at the portable subscriber device at step 424 as before. Alternatively, the method can skip checking the checksum if all errors are eliminated at step 414, but this may cause some falsing problems. If errors remain at step 414, then a determination is made whether further repeat messages should be expected at the portable subscriber unit at step 416. If no further repeats are expected, then the portable subscriber at step 418 can be programmed to either display the best resultant message (presumably the error reduced message) or alternatively negative acknowledge the message due to excessive errors and intelligibility. If more repeat messages are expected, then the method returns to step 406 as previously explained. Thus, the present invention corrects the error reduced message as necessary if an nth copy of the repeat message is received and if errors remain in the error reduced message by comparing a set of remaining errors in the error reduced message with an nth set of errors found in the nth copy of the repeat message to eliminate any further non-recurring errors.

As shown, the method may alternatively transmit a negative acknowledgment signal to the messaging system when an error is identified in a copy of the repeat message by the portable subscriber unit at step 411 even if non-recurring errors are found or if errors are still found in the error reduced message.

The processor 308 also is coupled to a read-only memory (ROM) 310 comprising firmware elements for use by the processor 308. The firmware elements comprise a call processing element 311 for handling of incoming messages on the outbound channel using techniques well known in the art. The call processing element 311 may further comprise routines to determine the current zone that the portable subscriber unit 122 is located in and procedures for updating the current zone identifier. In addition, the firmware elements preferably include a zone comparator 315, registration process 316, as well as a duplicate message processing routine 314.

When an address is received by the processor 308, the call processing element 311 compares the received address with at least one selective call addresses 323, and when a match is detected, a call alerting signal is preferably generated to alert a user that a message has been received. The call alerting signal is directed to a conventional audible or tactile alert device 318 coupled to the processor 308 for generating an audible or tactile call alerting signal. In addition, the call processing element 311 processes the message which preferably is received in a digitized conventional manner, and then stores the message in the message storage location 324 in the RAM 322. The message can be accessed by the user through conventional user controls 317 coupled to the processor 308, for providing functions such as reading, locking, and deleting a message. Alternatively, messages could be read through a serial port (not shown). For retrieving or reading a message, an output device 320, e.g., a conventional liquid crystal display (LCD), preferably also is coupled to the processor 308. It will be appreciated that other types of memory, e.g., EEPROM, can be utilized as well for the ROM 310 or RAM 322 and that other types of output devices, e.g., a speaker, can be utilized in place of or in addition to the LCD, particularly in the case of receipt of digitized voice.

The processor 308 preferably is implemented utilizing a microcomputer similar to the MC68HC11 series microcomputer, manufactured by Motorola, Inc. of Schaumburg, Ill. or other functionally equivalent Digital Signal Processor available from Motorola or Lucent Technologies. It will be appreciated that other similar microcomputers can be used as well for the processor 308, and that the ROM 310, the RAM 322, and/or the EEPROM 321 also can be included as a portion of the processor 308.

Before the fixed portion 102 can originate communication with a portable subscriber unit 122 in a zoned communication system, the fixed portion 102 should know the zone in which the portable subscriber unit 122 is located (unless a nationwide message is sent). In two-way messaging systems in accordance with present invention, the fixed portion 102 relies on the portable subscriber unit 122 to register when entering a new zone. When the fixed portion 102 has a message to deliver to a portable subscriber unit 122 but has not recorded the location of the portable subscriber unit 122 through a registration thereof, the fixed portion 102 proceeds with a series of broadcasts requesting the portable subscriber unit 122 to respond. By observing which base station 116 receives the PSU's response, the fixed portion 102 can determine the location of the portable subscriber unit 122.

It should be understood that the disclosed embodiments are merely examples and the invention is not restricted thereto. It will be understood by those skilled in the art that variations and modifications can be made within the scope and spirit of the present invention as defined by the appended claims.

What is claimed is:

1. A method for error correction processing of a repeat message transmitted to a portable subscriber unit in a messaging system wherein each repeat message may contain errors in different portions of the repeat message, comprising the steps at the portable subscriber unit of:

receiving a first copy of the repeat message containing a first set of errors;

identifying the first set of errors;

receiving a subsequent copy of the repeat message containing a subsequent set of errors;

identifying the subsequent set of errors;

comparing the first set of errors with the subsequent set of errors to eliminate any non-recurring errors in the formation of an error reduced message;

further correcting the error reduced message as necessary if an nth copy of the repeat message is received and if errors remain in the error reduced message by comparing a set of remaining errors in the error reduced message with an nth set of errors found in the nth copy of the repeat message to eliminate any further non-recurring errors.

2. The method of claim 1, wherein the method further comprises the step of transmitting a negative acknowledgment signal to the messaging system when an error is identified in a copy of the repeat message by the portable subscriber unit.

3. The method of claim 1, wherein the method further comprises the step of transmitting a negative acknowledgment signal to the messaging system when an error is identified in the error reduced message.

4. The method of claim 2, wherein the method further comprises the step of transmitting a request for retransmission of portions of the repeat message that contained identified errors.

5. The method of claim 1, wherein the method further comprises the step of transmitting an acknowledgment signal to the messaging system when no errors are identified in the error reduced message.

6. The method of claim 5, wherein the method further comprises the step of transmitting an acknowledgment signal to the messaging system only when no errors are identified in the error reduced message and a checksum value matches a predetermined checksum.

7. A selective call subscriber unit in a messaging system capable of error correcting messages that are sent repeatedly to the selective call subscriber device, comprising:

a receiver coupled to a decoder; and a processor coupled to the receiver and decoder and programmed to:
  receive a first copy of the repeat message containing a first set of errors;
  identify the first set of errors;
  receive a subsequent copy of the repeat message containing a subsequent set of errors;
  identify the subsequent set of errors;
  compare the first set of errors with the subsequent set of errors to eliminate any non-recurring errors in the formation of an error reduced message; and
  further correct the error reduced message as necessary if an nth copy of the repeat message is received and if errors remain in the error reduced message by comparing a set of remaining errors in the error reduced message with an nth set of errors found in the nth copy of the repeat message to eliminate any further non-recurring errors.

8. The selective call subscriber unit of claim 7, wherein the selective call subscriber unit further comprises a transmitter coupled to a encoder and further coupled to the processor.

9. The selective call subscriber unit of claim 8, wherein the processor is further programmed to command the transmitter to transmit a negative acknowledgment signal to the messaging system when an error is identified in a copy of the repeat message by the portable subscriber unit.

10. The selective call subscriber unit of claim 8, wherein the processor is further programmed to command the transmitter to transmit a negative acknowledgment signal to the messaging system when an error is still identified in the error reduced message.

11. The selective call subscriber unit of claim 8, wherein the processor is further programmed to command the transmitter to transmit a request for retransmission of portions of the repeat message that contained identified errors.

12. The selective call subscriber unit of claim 8, wherein the processor is further programmed to command the transmitter to transmit an acknowledgment signal to the messaging system when no errors are identified in the error reduced message.

13. The selective call subscriber unit of claim 12, wherein the processor is further programmed to command the transmitter to transmit an acknowledgment signal to the messaging system only when no errors are identified in the error reduced message and a checksum value matches a predetermined checksum.

* * * * *